July 2, 1940. J. H. SCHURCH 2,206,308
INDUCTION MOTOR
Filed Oct. 22, 1938 4 Sheets-Sheet 1

Inventor
JACOB H. SCHURCH,
By Arthur P. Knight and
Alfred W. Knight
Attorneys

July 2, 1940.  J. H. SCHURCH  2,206,308
INDUCTION MOTOR
Filed Oct. 22, 1938   4 Sheets-Sheet 2
Fig. 3.
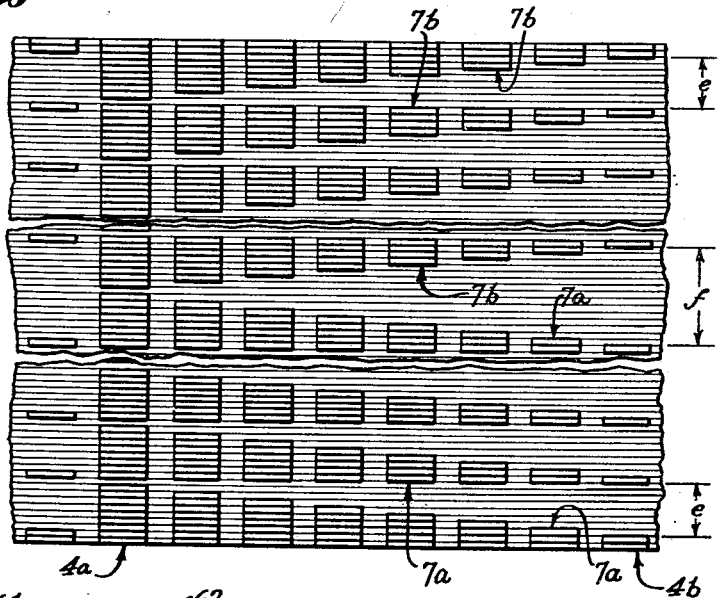
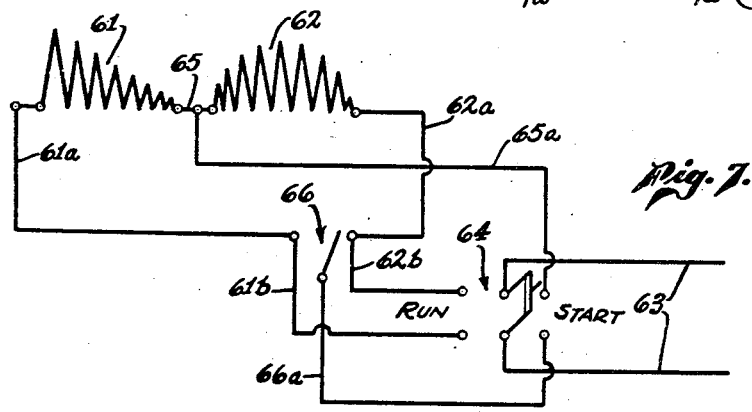
Fig. 7.
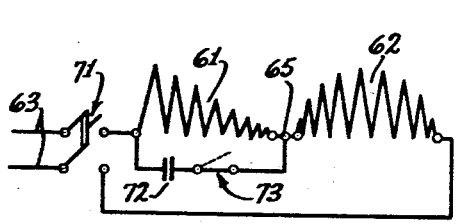
Fig. 8.
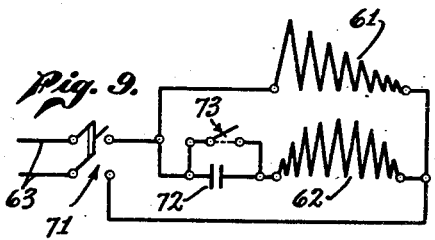
Fig. 9.
Inventor
JACOB H. SCHURCH,
By Arthur P. Knight and Alfred W. Knight
Attorneys July 2, 1940.　　　J. H. SCHURCH　　　2,206,308
INDUCTION MOTOR
Filed Oct. 22, 1938　　　4 Sheets-Sheet 3

Inventor
JACOB H. SCHURCH,
By
Attorneys

July 2, 1940.   J. H. SCHURCH   2,206,308
INDUCTION MOTOR
Filed Oct. 22, 1938   4 Sheets-Sheet 4

Inventor
JACOB H. SCHURCH,
By Arthur P. Knight and
Alfred W. Knight
Attorneys

Patented July 2, 1940

2,206,308

UNITED STATES PATENT OFFICE 2,206,308

INDUCTION MOTOR

Jacob H. Schurch, Los Angeles, Calif., assignor to Mono Phase, Inc., Los Angeles, Calif., a corporation of California Application October 22, 1938, Serial No. 236,567

8 Claims. (Cl. 172—278)

This invention relates particularly to single-phase induction motors of the type commonly called "self-starting," in that the rotor thereof will start rotation in a predetermined direction upon connection of the stator windings to a source of single-phase alternating current.

A particular object of the invention is to provide a single-phase induction motor with a high starting torque resulting from a novel stator pole construction and novel winding arrangement in conjunction therewith.

Another object of the invention is to provide a self-starting single-phase induction motor which, according to one embodiment thereof, may be selectively started in reverse directions and which exhibits excellent starting and running characteristics when starting and running in either direction.

Another important object of the invention is to increase the efficiency of self-starting single-phase induction motors by using high flux densities (densities on the order of those used in a polyphase motor) in the air gap and stator teeth while maintaining the flux densities in the rotor at values customarily employed in single-phase rotors. This increases the efficiency in the stator without decreasing the efficiency in the rotor and consequently increases the over-all efficiency of the motor.

A further object of the invention is to provide a motor of the type above described with a substantially sinusoidal flux distribution along each pole face in a direction along the periphery thereof when the motor is running.

Further objects and advantages of the invention will become apparent as the description proceeds.

A self-starting single-phase induction motor according to this invention comprises essentially a rotor mounted for rotation about a rotor axis, and a stator core providing a plurality of successive poles each having a pole face extending peripherally and axially with respect to the rotor and spaced radially from the rotor to provide an air gap, and each comprising a plurality of successive axially extending teeth which are spaced from one another to provide slots for receiving a stator winding. A novel feature of my construction resides in shortening the effective axial extent of the successive stator teeth progressively in one peripheral direction in at least a portion of each of the poles.

Customary constructions call for building the stator core including the poles from a plurality of thin stator core laminations, each of the core laminations being provided with a plurality of inwardly extending tooth sections which are spaced from one another to provide winding-receiving slots. The core laminations are usually stacked so that each tooth section of each core lamination cooperates with each tooth section of each succeeding lamination to form axially extending rows of tooth sections which extend clear across the stator and form teeth. My form of construction may be easily adapted to existing forms of construction by providing some of the stator laminations with fewer tooth sections than others and stacking and arranging said laminations so that in at least a portion of each of the poles there is a progressive decrease in one peripheral direction in the number of tooth sections in successive rows thereof. Thus the effective axial extent of successive stator teeth as determined by the number of tooth sections alined in successive rows is progressively less in one peripheral direction in at least a portion of each of the poles.

A distributed single-phase winding is caused to occupy at least a portion of the winding-receiving slots of each pole and is operable upon connection to a source of single-phase alternating current to start rotation of the rotor in a predetermined direction. It will be understood that the windings of the several poles are so connected and arranged that upon association with a single-phase source of alternating current successive poles are oppositely polarized, as is customary in motor constructions. Although the motor will operate satisfactorily with any one of a number of distributed single-phase induction motor windings, I prefer to use either an asymmetric winding as will be described more fully hereinafter, or a symmetric winding such as a concentric winding, or both of such windings, one superposed on the other in each of the poles.

The asymmetric winding of each pole may comprise a set of coils each comprising one or more conductors and comprising a plurality of coils of different pitches embracing teeth forming one pole, the coils being asymmetrically distributed so that the number of coils of each set embracing successive teeth progressively decreases in at least a portion of a pole, in the same peripheral direction in which there is a progressive decrease in the effective axial length of the stator teeth. With one form of asymmetric winding, the coils of each set progressively increase in pitch and all embrace the tooth of greatest axial length, which is preferably adjacent one edge of the corresponding pole, and progressively embrace also successively greater numbers of additional teeth forming that pole, in the above-defined peripheral direction.

A suitable symmetric winding of each pole may comprise a set of distributed concentric coils, which embrace teeth forming a pole and are positioned substantially symmetrically with respect to the peripheral mid-length of that pole.

Under ordinary circumstances the motor will start and run in one direction, when connected to a power source, with a properly distributed symmetric winding and will start and run in the opposite direction with an asymmetric winding. The motor, however, will exhibit improved running characteristics and will also be reversible if both the concentric and asymmetric windings are used, preferably with the concentric winding superposed on the asymmetric winding in slots of each pole. Thus the motor may be made to start selectively in reverse directions by connecting either one or the other of the windings with the alternating current supply lines and will continue to run in the starting direction with improved running characteristics upon the subsequent connection of both the windings, either in series or in parallel, to the supply line.

My invention will be better understood when described in conjunction with the accompanying drawings, in which:

Fig. 3 is a partially broken-away developed face view of a pole, showing a modified form of construction, which may be used in place of the pole illustrated in Fig. 2;

Fig. 7 is a wiring diagram illustrating connections which may be used for obtaining starting of the motor in selective reverse directions and running of the motor with the two sets of windings in series;

Fig. 8 is a wiring diagram illustrating the use of an auxiliary starting condenser for increasing the starting torque when the windings are connected in series; and Fig. 9 is a wiring diagram illustrating the use of such an auxiliary condenser when the windings are connected in parallel.

Figures 1, 2:
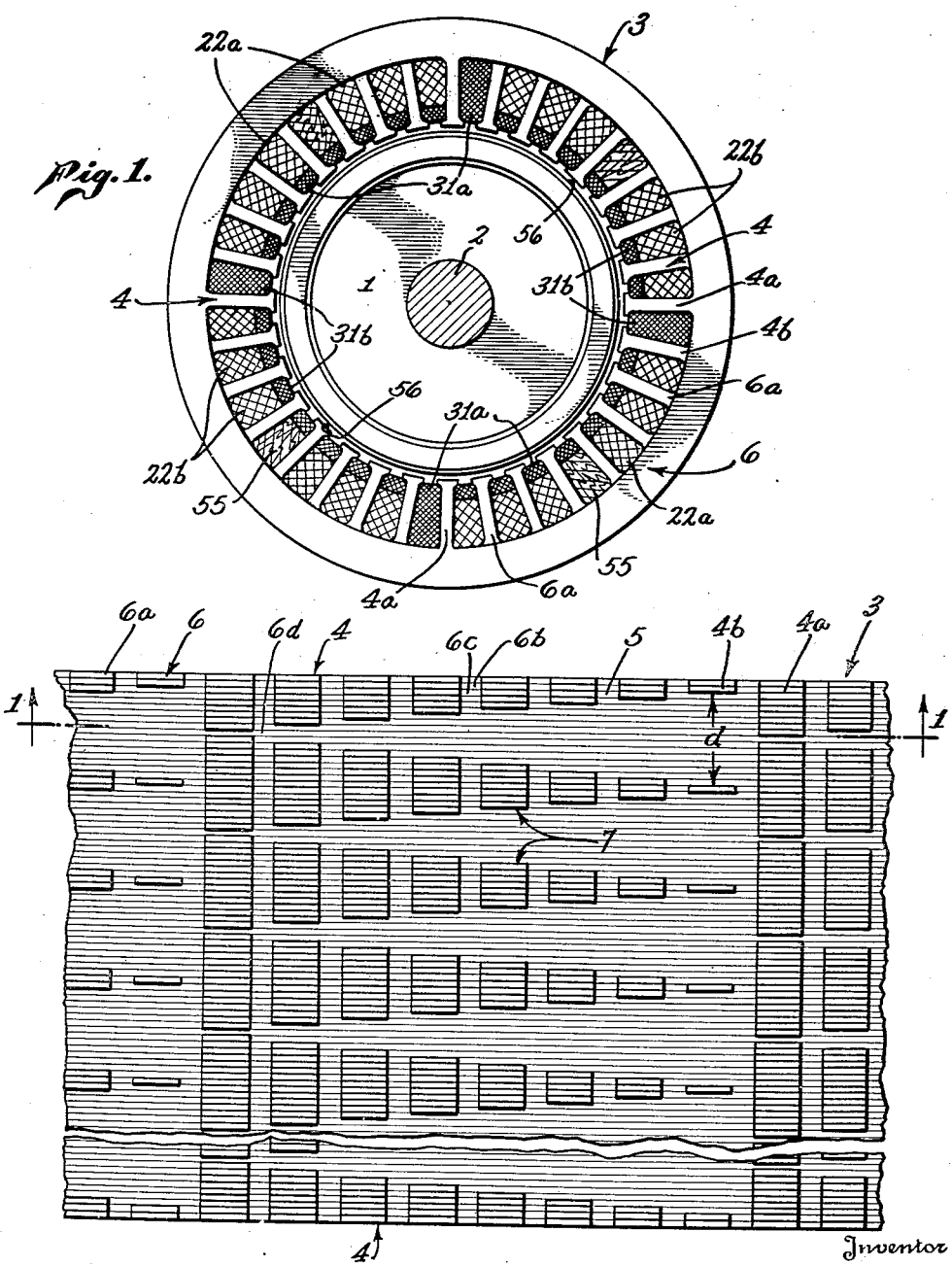
Fig. 1 is a transverse sectional elevation of a single-phase induction motor embodying a form of construction according to my invention, taken on line 1—1 in Fig. 2.
Fig. 2 is a partially broken-away face view of a pole of the motor illustrated in Fig. 1, as developed in a plane and enlarged, and with the windings omitted.

Referring to Figs. 1 and 2 of the drawings, the motor is shown as comprising a rotor 1 positioned within the cylindrical bore formed by stator core 3 and mounted for rotation on rotor shaft 2, which defines the rotor axis. The rotor 1 will not be described in detail, since any of the forms of rotors commonly employed with single-phase induction motors may be used, the most common form being one in which rotor bars are placed in rotor slots and are secured at each end to short-circuiting rings. For the most advantageous operation I prefer to employ a common form of rotor provided with closed slots, that is, a rotor in which the peripheral iron surface is substantially unbroken by winding slots.

The stator core 3 is shown as provided with a plurality of axially extending teeth 4 which are spaced from one another to provide winding-receiving slots 5 which also extend axially with respect to the rotor. The stator teeth 4 also provide faces for the stator poles. The stator shown is provided with thirty-two inwardly radially projecting, axially extending and peripherally spaced teeth, so that when the stator provides four poles, as it does in this case, each pole is made up of eight peripherally successive teeth.

The stator core 3 is shown as comprising a plurality of laminations 6, one hundred or more for example, each provided with a plurality of radially inwardly extending tooth sections 6a, which, when the laminations are stacked, are alined in successive axially extending rows to form the successive axially extending teeth 4. In constructing a motor according to my invention, some of the laminations have fewer tooth sections than others. For example, lamination 6c has four less tooth sections than lamination 6b, one less tooth section for each pole and, similarly, the number of tooth sections per pole is decreased by one in each successive lamination from 6c through 6d. Lamination 6d is shown without any tooth sections in order to increase ventilation; however, this lamination may be provided with one or more tooth sections per pole if desired.

It may be assumed that the laminations comprising the omitted central portion of the pole illustrated in Fig. 2 will be stacked and arranged in the same orderly fashion as the laminations shown, in which case it may be seen that the laminations 6 are so stacked and arranged that in at least a portion of the pole (in this particular case, the whole peripheral extent of the pole) there is a progressive decrease in one peripheral direction in the number of tooth sections in successive rows and hence a progressive decrease in the effective axial extent of the successive teeth as made up by successive rows of tooth sections.

An inspection of the developed face view of the pole illustrated in Fig. 2 will show that the face of the pole is made up of a plurality of upstanding substantially triangular areas 7 generally resembling isosceles triangles. The bases of these triangles lie on a common tooth 4a and the altitudes of the triangles are parallel and extend in the same direction along lines parallel to the plane of rotation of the rotor, i. e., perpendicular to the rotor axis. With this arrangement the adjacent tooth sections making up tooth 4b, the tooth of shortest axial extent, are uniformly spaced from one another by a distance d. Thus the fringing of the flux from the edges of the adjacent triangles 7 to the rotor is substantially the same for all the triangular sections. Also the flux distribution axially along the rotor is substantially uniform, the flux density not being appreciably less in the center than at any other portion.

Referring now to Fig. 3, a developed face of a pole is illustrated which embodies a construction according to my invention which may be obtained by stacking and arranging the stator laminations in a different order than illustrated in Fig. 2. With this arrangement the face of the pole is also made up of a plurality of triangular sections with their bases forming tooth 4a and their apexes forming tooth 4b. In this case, however, the sections resemble right triangles;

all the sections may be substantially the same, but sections 7a making up one side of the stator all have their hypotenuses facing toward the axially central portion of the stator and sections 7b making up the other side of the stator also have their hypotenuses facing toward the central portion of the stator. Thus on each side of the stator the adjacent tooth sections making up tooth 4b are spaced uniformly by a distance e which is less than the distance d of Fig. 2. This will reduce the fringing between adjacent sections 7a and 7b. Also, by using the two sets of oppositely facing triangular sections, the axial forces on the rotor may be balanced and the flux density in the axial central portion of the rotor reduced. Where the two sections 7a and 7b meet, the tooth sections comprising tooth 4b are spaced a distance f which is greater than the distance e. Hence, the flux density in the rotor is lower in the central portion thereof. Also, this larger open section tends to improve ventilation especially if the center of the stator is provided with a ventilating slot.

It will be appreciated that it is not necessary to so stack and arrange the core laminations that a symmetrical design of the pole face such as illustrated in Fig. 2 is obtained. Thus a laminated stator core may be provided in which the effective axial extent of the successive teeth in at least a portion of each of the poles is progressively less in one peripheral direction, by stacking the laminations shown in Fig. 2 in a different order without providing any particular geometric design for the pole face, as long as there is the required number of tooth sections making up each tooth. I prefer, however, to stack and arrange the laminations in a predetermined manner in order to obtain better operating characteristics and also to obtain maximum ventilation. I also prefer to form the outside edges of the stator with at least two laminations having a full number of tooth sections in order to increase the mechanical strength of the teeth having fewest tooth sections, so as to prevent damage thereto during winding. An inspection of Figs. 2 and 3 will show the stators to be constructed in such a manner.

Figure 4:
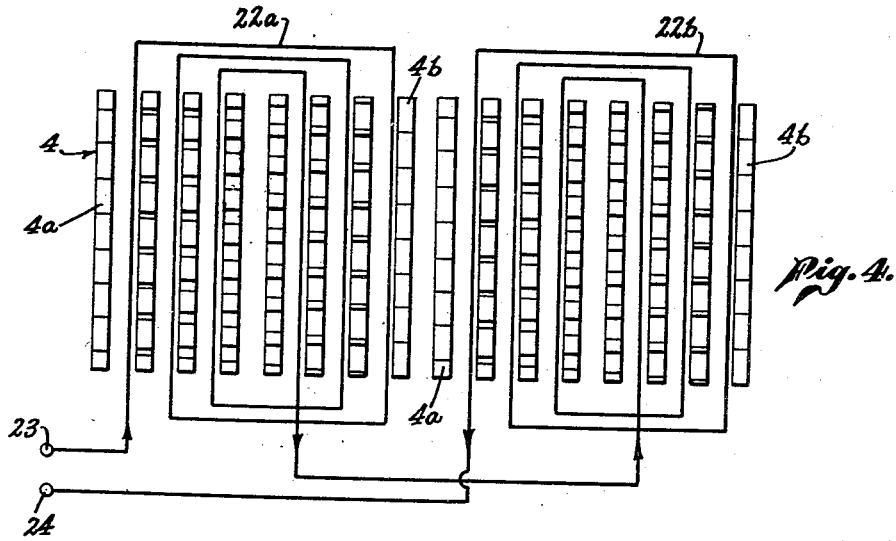
Fig. 4 is a developed diagrammatic face view of a stator pole structure according to my invention, provided with a concentric winding.

Referring to Fig. 4, a stator comprising two poles is illustrated, which stator may comprise the poles of a two-pole machine or may comprise, for example, two of the four poles of the machine illustrated in Figs. 1 and 2. In either event, the application of the principles illustrated will be the same. Assuming for the sake of simplicity that the stator comprises two of the four poles of the machine illustrated in Fig. 1, the stator is shown as comprising a plurality of axially extending teeth 4, which in each pole decrease in effective axial length progressively from a tooth 4a located at one edge of the pole to a tooth 4b located at the opposite edge of the pole. Substantially symmetrically disposed windings are shown positioned in the slots of each pole and the windings may comprise two sets of concentric coils, each comprising one or more conductors, represented diagrammatically by lines 22a and 22b respectively. The coils of each set are distributed in the slots of the pole and embrace teeth of that pole, and are positioned mechanically substantially symmetrically with respect to the peripheral mid-length of that pole. The actual mechanical construction and arrangement of the sets of coils 22a and 22b and the number of turns in each coil need not be detailed herein since they will depend upon many factors and may be readily determined from common design factors as will be apparent to skilled workers in the art. The sets of coils 22a and 22b are shown connected in series to terminals 23 and 24, although parallel connections may be used if desired. Upon connection of the terminals 23 and 24 with a source of single-phase alternating current, the coil sets 22a and 22b will oppositely polarize the successive poles which they embrace, and the rotor which may be associated with the stator illustrated in Fig. 4, for example the rotor 1 of Fig. 1, will start to rotate in a direction from a tooth 4b toward the tooth 4a of the same pole, that is, in the direction opposite to the direction of progressive decrease in axial extent of the teeth.

Figure 5:
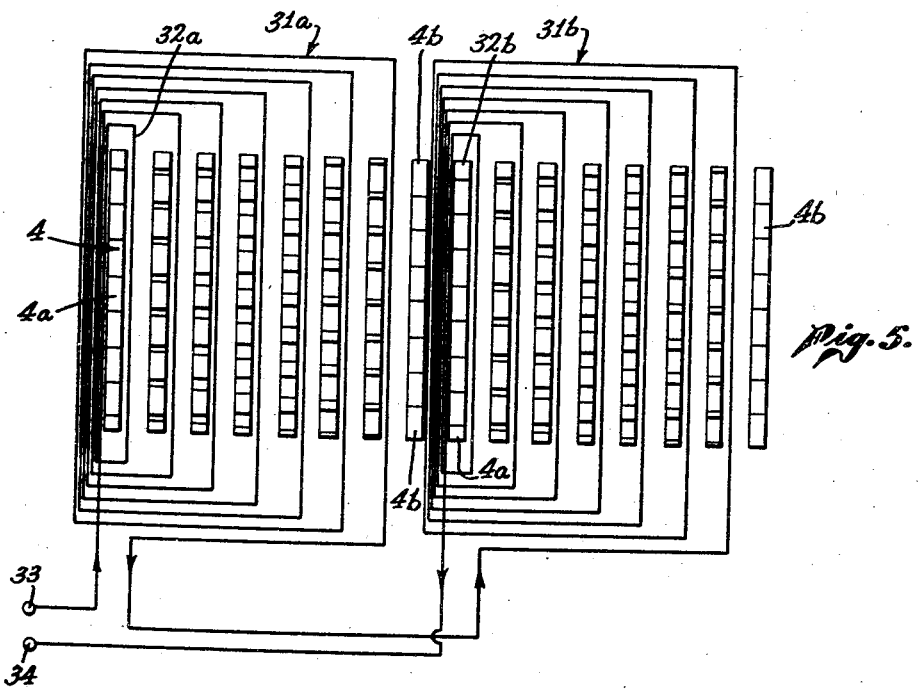
Fig. 5 is a similar view of a stator pole structure showing an asymmetric winding according to this invention.

Referring to Fig. 5, a stator comparable to that illustrated in Fig. 4 is shown provided with sets of coils in which the coils of each set embrace teeth forming one pole and are respectively indicated at 31a and 31b. The coils of each set are asymmetrically distributed in the slots of the corresponding pole in such manner that the number of coils embracing successive teeth in at least a portion of a pole is progressively less in one peripheral direction. This progressive decrease is in the same direction in which there is a progressive decrease in the respective axial extent of successive stator teeth. In the winding illustrated, the coils of each set all pass through one slot adjacent one edge of a pole, for example, the slot immediately outside of the tooth 4a of greatest axial extent of that pole, and progressively increase in pitch so that all of said coils embrace said tooth 4a and progressively embrace also successively greater numbers of additional teeth forming that pole in the same peripheral direction in which there is a progressive decrease in the effective axial extent of successive stator teeth.

It is not necessary for all of the coils of any one set to pass through a single slot but they may be distributed throughout several slots as long as the desired asymmetry of the windings is obtained. Also, it is not necessary for the shortest pitched coil of each set (coils 32a and 32b) to span only a single tooth, it being more desirable in some cases to have these shortest pitched coils span two or more teeth.

The coil sets 31a and 31b are shown connected in series and to terminals 33 and 34, although they may be connected in parallel, so that upon connection of the terminals 33 and 34 to a single phase source of alternating current the coils 31a and 31b will oppositely polarize the poles which they embrace, and a rotor, such as the rotor 1 associated with stator illustrated in Fig. 5, will start rotation in the direction from a tooth 4a toward the tooth 4b of the same pole, that is, in the direction in which both the axial extent of the teeth and the number of coils embracing successive teeth progressively decrease.

Figure 6:
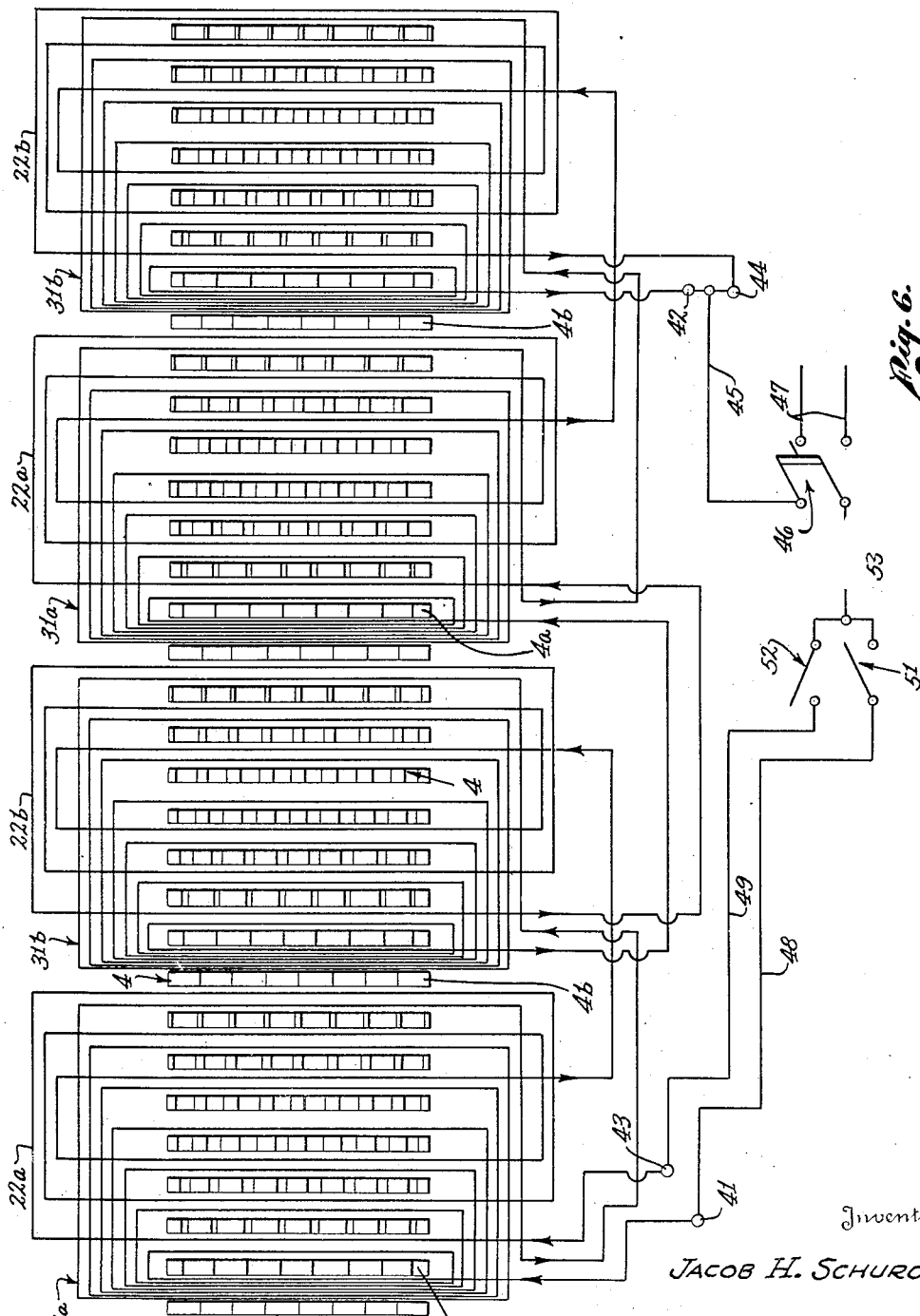
Fig. 6 is a diagrammatic view of the stator of the motor illustrated in Fig. 1, developed in a plane with a preferred winding diagram therefor.

Referring particularly to Fig. 6, the stator of the motor illustrated in Figs. 1 and 2 is shown developed as a plane and provided with both the symmetric and asymmetric coil windings illustrated in Figs. 4 and 5 respectively. The successive poles are shown as provided with asymmetric windings 31a and 31b along with symmetric windings 22a and 22b. The respective sets of coils 31a and 31b are all connected in series to the terminals 41 and 42 in such manner that when current traverses the coils the coils oppositely polarize the successive poles. The symmetric coils 22a and 22b are shown connected in series between terminals 43 and 44 in such manner as to polarize the poles with the same polarity as produced by the asymmetric coils on these poles. Terminals 42 and 44 are shown connected together and to a conductor 45 leading to one side of a line switch 46 which when closed connects conductor 45 to one side of a supply line 47. Terminals 41 and 43 are respectively connected through conductors 48 and 49 to single-pole single-throw switches 51 and 52 respectively. Switches 51 and 52 are shown connected to a conductor 53 leading to the other side of the line switch 46.

Upon closing line switch 46 both sets of coils are connected through conductor 45 to one side of supply line 47 and the other side of either one of the windings may be connected to the other side of supply line 47 through conductor 53 by closing either one of the switches 51 or 52. The motor will start in one direction when switch 51 is closed, placing the asymmetric winding in series with the supply line 47, and will start in the opposite direction when switch 52 is closed, placing the symmetrical or concentric winding in series with the line 47. After starting the motor by closing either one of the switches 51 or 52, the other of the switches 51 or 52 is then closed and the motor continues to run in the direction of starting with both the asymmetric and symmetric windings connected to the supply line 47.

It will be appreciated, of course, that the symmetric and asymmetric windings need not be connected in parallel when the motor is running, but that they may be connected in series. However, the parallel connection of the two windings does present an advantage in that the mechanical centers of the magnetic poles produced by the respective windings embracing the teeth of each pole are mechanically displaced along the periphery of the stator in each pole, so that by proportioning the windings to accentuate the power factor differences between them, mechanically displaced out of phase fluxes may be produced in each pole. On the other hand, the series connection of the two sets of coils presents a definite advantage in that each set of windings may have a lower reactance, and a higher starting current and starting torque may be obtained.

Referring again to Fig. 1, the coils illustrated diagrammatically in Figs. 4–6 are shown in cross-section as positioned in the slots. It may be seen that the symmetric or concentric sets of coils 22a and 22b (indicated by light cross-hatching) are placed in the bottom (radially outer portion) of the slots and that the asymmetric sets of coils 31a and 31b (indicated by heavy cross-hatching) are superposed on the symmetric winding and are placed in the slots above (radially inward of) the symmetric winding. This tends to increase the reactance of the symmetric windings and to decrease the reactance of the asymmetric windings and is particularly advantageous when the motor is generally started in one direction with the asymmetric windings, since a high starting current and starting torque may be obtained. With the arrangement shown, the center slot in each pole contains only one coil so the remainder of the slot is filled with a spacer such as a wood block 55 which holds the asymmetric coil out toward the tips of the stator teeth.

Although I may provide the stator with only a single set of coils, either asymmetric or symmetric, and obtain satisfactory operation of the motor as previously stated, I prefer to provide the stator with both asymmetric and symmetric sets of coils. With the two sets of coils the motor is reversible, which is a particularly important feature in a self-starting single-phase induction motor. Also, by using the two sets of coils I am able to obtain a somewhat sinusoidal flux distribution across the face of each pole in a direction along the periphery thereof. This is of particular advantage since this arrangement of coils provides a higher efficiency than can be obtained with either the symmetric or asymmetric coils alone. This increase in running efficiency is particularly noticeable when compared with the efficiency which is obtained with the asymmetric coils alone. As I prefer to start with the sets of asymmetric coils, the motor exhibiting more favorable starting characteristics with these coils than with the symmetric coils, it is of particular advantage to also provide the symmetric coils for each pole for correcting the polar flux distribution when the motor is running, so that the running efficiency is increased.

The type of pole face disclosed herein allows the use of relatively high flux densities in the stator teeth and in the air gap, indicated by the numeral 56 in Fig. 1, between the stator teeth and the rotor. This is particularly true when using a rotor with closed slots. At the peripheral surface of the rotor immediately adjacent the stator teeth there is a relatively high flux concentration and with the stator arrangements shown, approximately only 50% of the effective rotor surface is subjected to this high flux density. However, since the rotor surface consists principally of iron, the flux entering the surface thereof immediately spreads out and passes through all the available iron of the rotor in traveling from one stator pole face to the next. Thus, practically irrespective of the flux distribution in the air gap, the flux in passing through the rotor tends to spread out uniformly and acts as though the flux was received uniformly from the total surface of the face of each pole embracing the rotor. From this it is seen that I am able to greatly increase the flux density in the stator teeth, for example to a value double that ordinarily used in single-phase induction motor stator teeth, without appreciably increasing the flux density in the rotor and as a consequence without appreciably increasing the rotor iron losses. The rotor iron losses are a matter of considerable importance. By using the pole construction according to my invention I am able to use flux densities in the stator teeth which approach the flux densities used in a three-phase motor with its attendant advantages.

Referring to Fig. 7, the stator wiring of a motor comparable to that shown in Fig. 6 is illustrated diagrammatically, the asymmetric coils being designated 61 and the symmetric coils 62. A single-phase line 63 is shown connected to the moving contacts of a double-pole double-throw switch 64, which when thrown to a starting position is operable to connect one side of the line through conductor 65a to a connection 65 between the sets of coils 61 and 62 and the other side of the line through conductor 66a to the movable arm of a single-pole double-throw switch 66. The switch 66 is operable to one position to establish connection through conductor 61a to the outside end of coils 61 and to another position to establish connection through conductor 62a to the outside end of coils 62. Thus when switch 64 is placed in starting position, the motor will run in one direction or the other depending upon the position of switch 66. After the motor has started to run, throwing switch 64 to its next or run position will disconnect point 65 from the circuit and connect windings 61 and 62 in series across the supply line 63, through conductors 61a and 61b and 62a and 62b.

In Fig. 8 another arrangement for running with the sets of coils connected in series is illustrated in which the coils 61 are shunted by a condenser 72 through a switch 73 which is normally closed when the motor is starting and at standstill. Upon closing line switch 71 the current supplied from power lines 63 is out of phase in the coils 61 and 62 by virtue of the condenser 72 which is effectively in series with the coils 62. This produces out of phase mechanically displaced fluxes in each pole and tends to produce a relatively high starting torque. After the motor has started the switch 73 may be opened to the dotted position, in which case the condenser 72 is disconnected from the circuit and the coils 61 and 62 remain connected in series, the motor then running as with the connections shown in Fig. 7.

With the coils proportioned substantially as stated hereinafter and the condenser in shunt with coils 61, the motor starts in the same direction as it does when the coils 62 alone are used for starting but has a somewhat higher starting torque. By connecting the condenser 72 in shunt with coils 62 the motor may be made to start in the opposite direction. Also the motor may be made to reverse its direction of rotation when running in either direction by shunting either one or the other of the sets of coils 61 and 62 with the condenser 72. Thus if the motor has been started with the symmetric coils 62, either with these coils alone or by using coils 61 and 62 in series and shunting coils 61 with a condenser, and is running in the direction of starting, with the condenser disconnected, the motor may be reversed while running by connecting the condenser 72 in shunt with coils 62, after which the condenser may again be disconnected. Obviously, various switching arrangements may be used to change the connections to obtain starting in selectively reverse directions, or reversal while the motor is running in either direction.

The sets of coils 61 and 62 are shown connected for starting with the condenser 72 and are connected in parallel in Fig. 9, the condenser 72 being in series with coils 62. In this case the switch 73 is in shunt with the condenser 72 and is normally open when the motor is at a standstill and during starting, and is closed to the dotted position, short-circuiting condenser 72, when the motor has attained running speed. With correctly proportioned windings and with a condenser of the correct capacity, the motor will start in the same direction as when coils 62 are used alone for starting. The motor may also be started by placing condenser 72 in series with coils 61. The obtaining of optimum starting characteristics and reversal of the motor when using the parallel connection of the coils will, of course, depend to a large extent upon the electrical constants of the coils and the condenser as well as the mechanical displacements of the two sets of coils. The calculations required for obtaining the desired results are a matter of common knowledge and it is not necessary that they be set out here.

The switch 73 may be centrifugally or current operated so that the condenser 72 may be removed from circuit automatically when the motor has attained a given speed or when the starting current has approached a given low value. The use of such switches as well as the construction thereof is a matter of common knowledge in the art and need not be described herein. It will also be appreciated that the switching arrangements illustrated in Figs. 4 to 9 may be modified considerably and still bring about the desired operation. It should also be recognized that when the two sets of coils have certain proportions, one set thereof may be short-circuited while the other set is connected to the line to produce a transformer action between the two sets of coils and starting with modified starting characteristics.

Numerous forms of windings may be used to obtain the desired asymmetric and symmetric winding distribution on the poles, as will be apparent to one skilled in the art. Furthermore, the windings may be brought out to terminals so that they may be connected to operate, for example, on either 110 or 220 volts in accordance with common practice. As I have stated before, the actual proportioning of the asymmetric and symmetric windings is largely a matter of design. As an example, I have found that with a motor as shown in Figs. 1 and 6, the symmetric coils may comprise thirty-two turns each, and each of the asymmetric coils may comprise nine turns each, when the coils are connected for series operation. The proportioning of the coils shown, that is, the pitch of each coil and the number of coils per set, is satisfactory for a motor provided with thirty-two slots, although it will be understood that the number of slots per pole may be either odd or even and that the coils may be positioned in all or in only a part of the slots in each pole, and that the pitch of each coil and the number of coils per set may be modified considerably to meet existing conditions.

As brought out in the foregoing description, it may be seen that the motor of this invention is susceptible to wide modifications, hence I do not choose to be restricted to the non-limitative examples shown and described but rather to the scope of the appended claims.

I claim:

1. A self-starting single-phase induction motor which comprises: a rotor; a stator core comprising a plurality of core laminations each provided with a plurality of inwardly extending tooth sections, stacked to provide a plurality of successive poles each having a pole face extending peripherally and axially with respect to said rotor and spaced radially from said rotor, and each comprising a plurality of successive axially extending rows of tooth sections spaced to form slots extending axially with respect to said rotor, some of said laminations having fewer tooth sections than others and being so arranged that in at least a portion of each of said poles there is a progressive decrease in one peripheral direction in the number of tooth sections in successive rows; and a distributed single-phase winding occupying at least a portion of said slots in each of said poles and operable upon connection to a source of alternating current to oppositely polarize successive poles.

2. A self-starting single-phase induction motor which comprises: a rotor; a stator core providing a plurality of successive poles each having a pole face extending peripherally and axially with respect to said rotor and spaced radially from said rotor, and each comprising a plurality of successive axially extending teeth spaced to provide slots, the effective axial extent of the successive teeth in at least a portion of each of said poles progressively decreasing in one peripheral direction; and a distributed single-phase winding occupying at least a portion of said slots in each of said poles and operable upon connection to a source of alternating current to oppositely polarize successive poles.

3. A motor as set forth in claim 2, said distributed single-phase winding comprising sets of concentric coils, each set of which embraces teeth forming a pole and is positioned substantially symmetrically with respect to the peripheral mid-length of that pole.

4. A motor as set forth in claim 2, said distributed single-phase winding comprising sets of coils, each set comprising a plurality of coils of different pitches embracing teeth forming one pole, the coils of each set being asymmetrically distributed so that the number of coils embracing successive teeth in at least a portion of each pole progressively decreases in said peripheral direction.

5. A self-starting single-phase induction motor which comprises: a rotor; a stator core providing a plurality of successive poles each having a pole face extending peripherally and axially with respect to said rotor and spaced radially from said rotor, and each comprising a plurality of successive axially extending teeth spaced to provide slots, the effective axial extent of the successive teeth in at least a portion of each of said poles progressively decreasing in one peripheral direction; a plurality of sets of distributed concentric coils occupying at least a portion of the slots in the respective poles, each set of which embraces teeth forming a pole and is positioned substantially symmetrically with respect to the peripheral mid-length of that pole; and a plurality of other sets of distributed coils occupying at least a portion of the slots in the respective poles, each set of which comprises a plurality of coils of different pitches embracing teeth forming one pole, the coils of each set being asymmetrically distributed so that the number of coils embracing successive teeth in at least a portion of each pole progressively decreases in said peripheral direction.

6. A reversible single-phase induction motor, which comprises: a rotor; a stator core providing a plurality of successive poles each having a pole face extending peripherally and axially with respect to said rotor and spaced radially from said rotor, and each comprising a plurality of successive axially extending teeth spaced to provide slots, the effective axial extent of the successive teeth in at least a portion of each of said poles progressively decreasing in one peripheral direction; a plurality of sets of distributed concentric coils occupying at least a portion of the slots in the respective poles, each set of which embraces teeth forming a pole and is positioned substantially symmetrically with respect to the peripheral mid-length of that pole; and a plurality of other sets of distributed coils occupying at least a portion of the slots in the respective poles, each set of which comprises a plurality of coils of different pitches embracing teeth forming one pole, the coils of each set being asymmetrically distributed so that the number of coils embracing successive teeth in at least a portion of each pole progressively decreases in said peripheral direction, whereby said rotor will start in one direction upon connection of only one of said sets of coils with an alternating current source and in the other direction upon connection of only the other of said sets of coils with said source, and will continue to run in the direction of starting upon subsequently connecting both of said sets of coils with said source.

7. A self-starting single-phase induction motor which comprises: a rotor; a stator core providing a plurality of successive poles each having a pole face extending peripherally and axially with respect to said rotor and spaced radially from said rotor, and each comprising a plurality of successive axially extending teeth spaced to provide slots, the effective axial extent of the successive teeth in at least a portion of each of said poles progressively decreasing in one peripheral direction; a plurality of sets of distributed concentric coils occupying at least a portion of the slots in the respective poles, each set of which embraces teeth forming a pole and is positioned substantially symmetrically with respect to the peripheral mid-length of that pole, a plurality of other sets of distributed coils occupying at least a portion of the slots in the respective poles, each set of which comprises a plurality of coils of different pitches embracing teeth forming one pole, the coils of each set being asymmetrically distributed so that the number of coils embracing successive teeth in at least a portion of each pole progressively decreases in said peripheral direction; a source of single-phase alternating current; and switching means associated with said source of current and with said sets of coils and operable to connect either one of said sets of coils with said source of current or both of said sets of coils with said source of current.

8. A stator core for use in a single-phase induction motor, which comprises: a plurality of core laminations each provided with a plurality of inwardly extending tooth sections, stacked to provide a plurality of successive poles each having a pole face, and each comprising a plurality of successive axially extending rows of tooth sections spaced to form axially extending winding-receiving slots, some of said laminations having fewer tooth sections than others and being so arranged that in at least a portion of each of said poles there is a progressive decrease in one direction in the number of tooth sections in successive rows.

JACOB H. SCHURCH.